(12) United States Patent
Nashizawa

(10) Patent No.: US 8,605,164 B2
(45) Date of Patent: Dec. 10, 2013

(54) IMAGE PROCESSING APPARATUS, CONTROL METHOD THEREFOR, AND STORAGE MEDIUM

(75) Inventor: Hiroaki Nashizawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 508 days.

(21) Appl. No.: 12/760,209

(22) Filed: Apr. 14, 2010

(65) Prior Publication Data

US 2010/0265352 A1    Oct. 21, 2010

(30) Foreign Application Priority Data

Apr. 20, 2009  (JP) ................. 2009-101859

(51) Int. Cl.
*H04N 5/228*  (2006.01)
*G06K 9/00*  (2006.01)

(52) U.S. Cl.
USPC ........................................ 348/222.1; 382/162

(58) Field of Classification Search
None
See application file for complete search history.

(56) References Cited

U.S. PATENT DOCUMENTS

| | | | | |
|---|---|---|---|---|
| 5,552,827 | A * | 9/1996 | Maenaka et al. | 348/266 |
| 6,603,878 | B1 * | 8/2003 | Takemoto | 382/167 |
| 6,930,711 | B2 | 8/2005 | Fukui et al. | |
| 7,835,573 | B2 * | 11/2010 | Kang et al. | 382/167 |
| 2007/0013794 | A1 * | 1/2007 | Tsuruoka | 348/241 |
| 2008/0247671 | A1 * | 10/2008 | Yasuma et al. | 382/300 |
| 2009/0115870 | A1 | 5/2009 | Sasaki | |
| 2010/0177961 | A1 * | 7/2010 | Kalman | 382/167 |

FOREIGN PATENT DOCUMENTS

| | | |
|---|---|---|
| JP | 2002-300590 | 10/2002 |
| JP | 2008-035470 | 2/2008 |
| JP | 2008-258931 A | 10/2008 |

* cited by examiner

*Primary Examiner* — Luong T Nguyen
(74) *Attorney, Agent, or Firm* — Cowan, Liebowitz & Latman, P.C.

(57) ABSTRACT

An image processing apparatus that enables a demosaicing process to be accurately carried out on a color image signal. With respect to a color mosaic image signal related to each pixel generated by photoelectrical conversion of an optical image reflecting a subject image, an interpolation process is carried out in which signals of missing colors in the each pixel are interpolated using image signals related to pixels in predetermined directions around the each pixel. The interpolation process is carried out in each of a plurality of predetermined directions. Color image signals in the predetermined directions subjected to the interpolation process are evaluated, and based on an evaluation result, a color image signal to be outputted as an interpolation process result is generated. The color image signals in the respective predetermined directions subjected to the interpolation process are evaluated with respect to homogeneity and signal intensity.

10 Claims, 16 Drawing Sheets

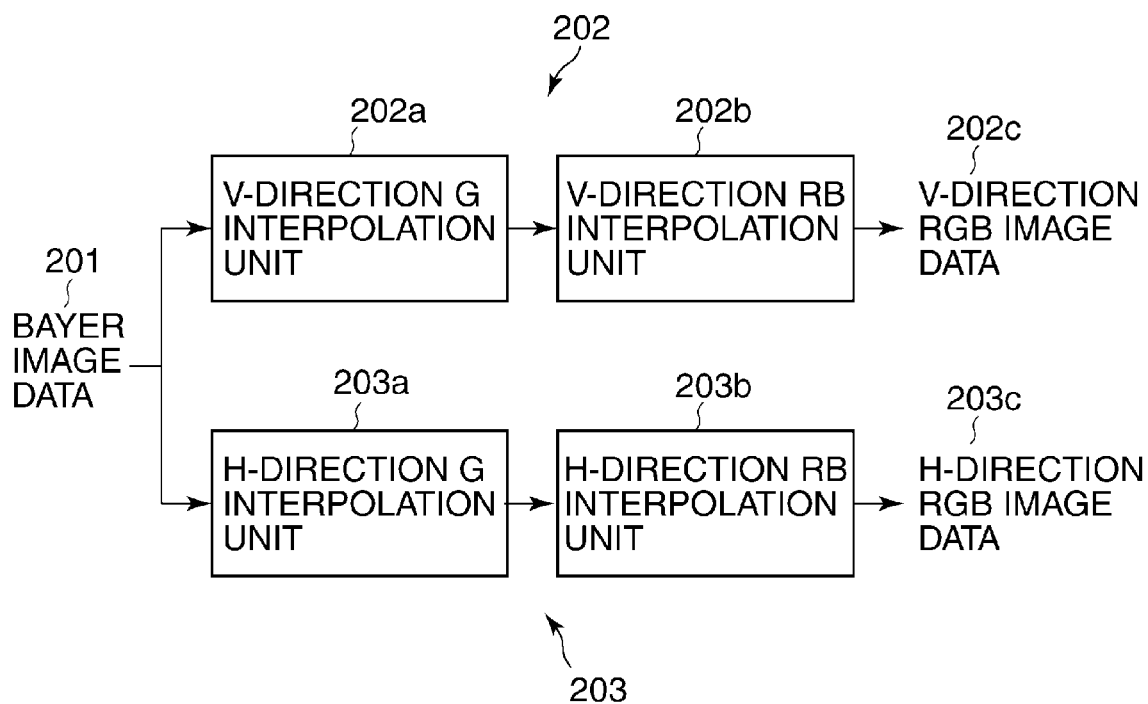

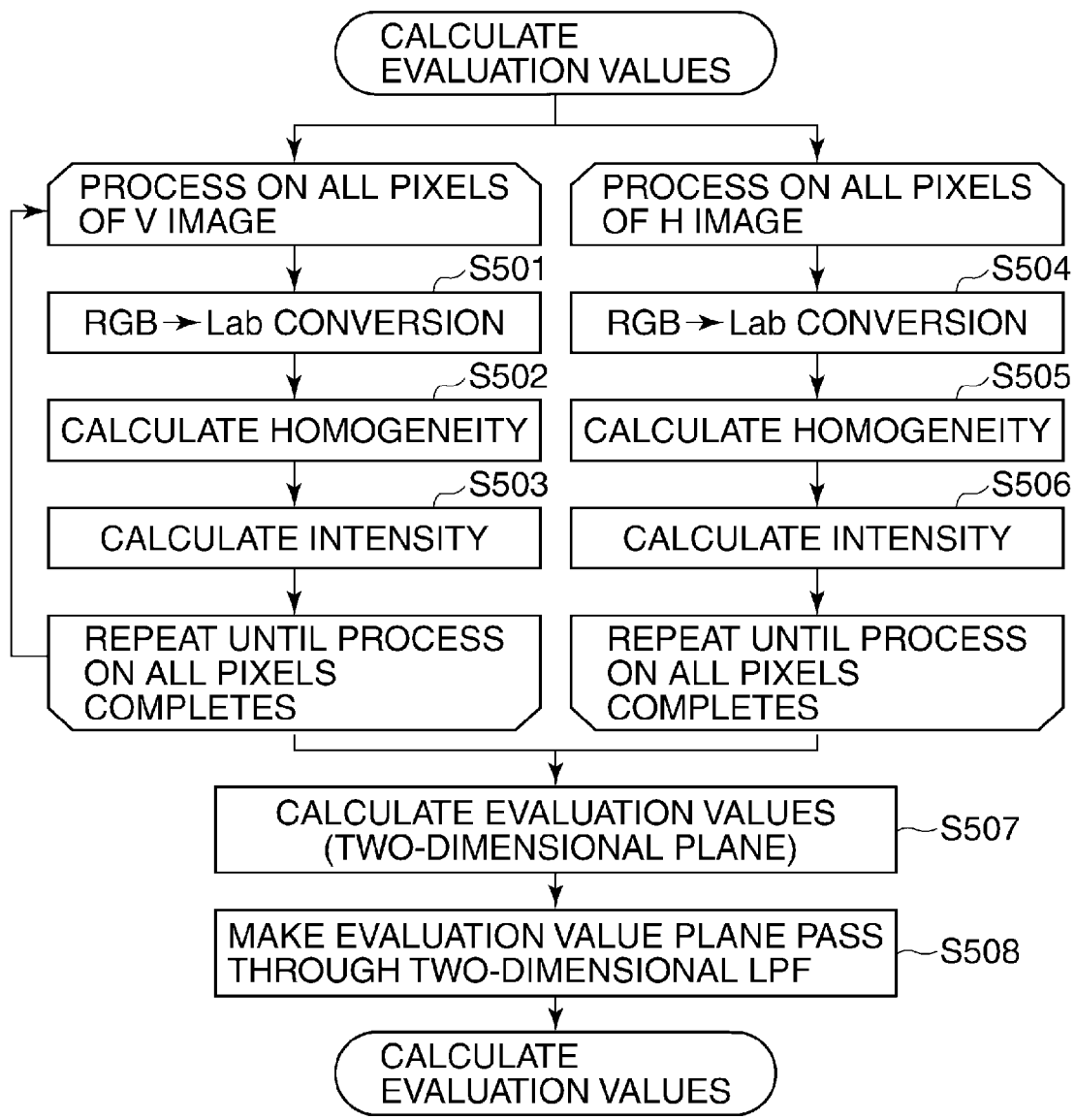

FIG.11A

| h11 | h12 | h13 |
|-----|-----|-----|
| h21 | h22 | h23 |
| h31 | h32 | h33 |

FIG.11B

| v11 | v12 | v13 |
|-----|-----|-----|
| v21 | v22 | v23 |
| v31 | v32 | v33 |

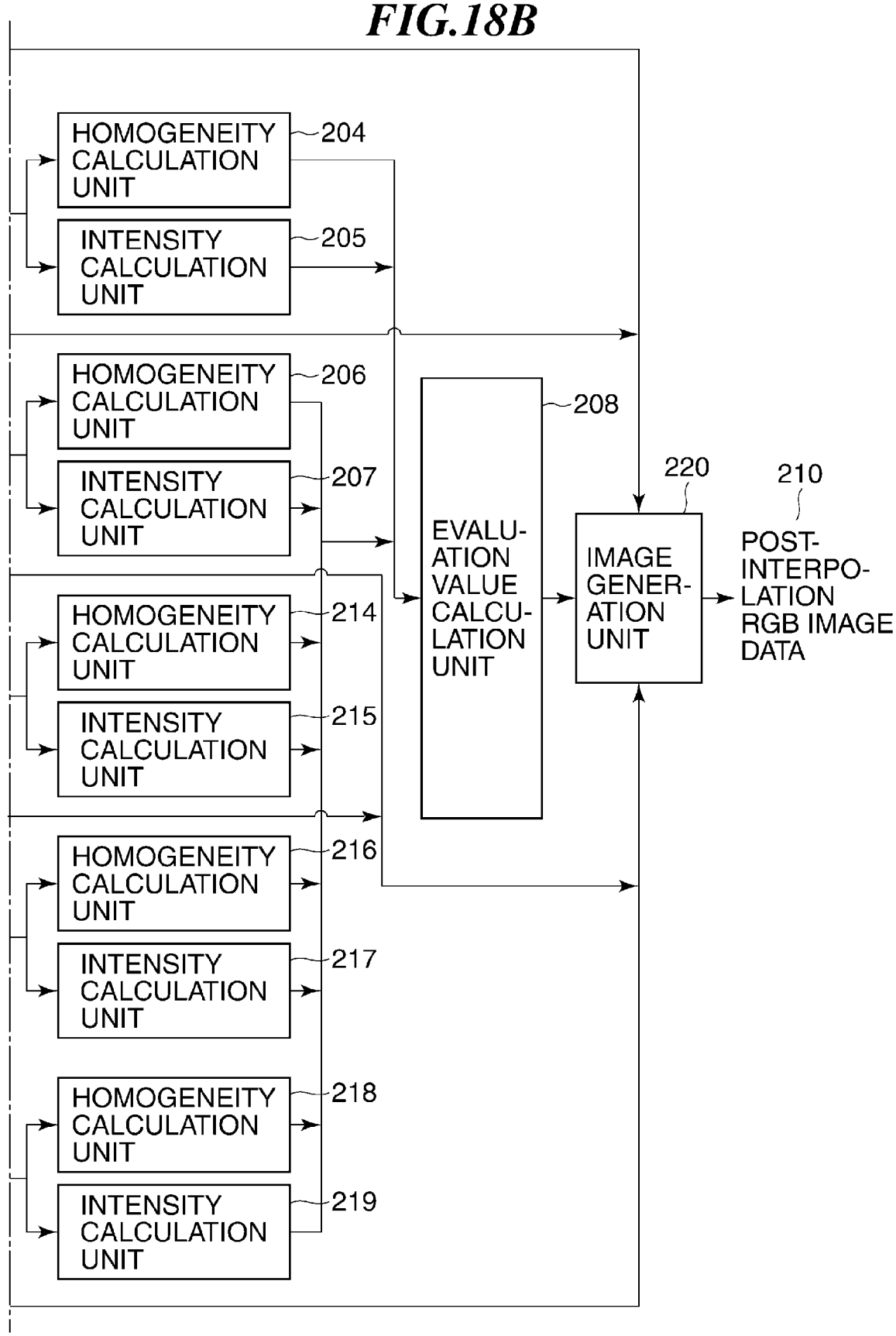

*FIG.19*

| R | G | R | G |
|---|---|---|---|
| G | B | G | B |
| R | G | R | G |
| G | B | G | B |

IMAGE PROCESSING APPARATUS, CONTROL METHOD THEREFOR, AND STORAGE MEDIUM

BACKGROUND OF THE INVENTION

1. Field of the Invention

The present invention relates to an image processing apparatus, and in particular to an image processing apparatus and a control method therefor that carry out demosaicing by interpolating missing color signals for each pixel in a color image signal, as well as a computer-readable storage medium storing a program for causing a computer to execute the method.

2. Description of the Related Art

Conventionally, in a color image sensor, color filters in a Bayer pattern as shown in FIG. 19 are used. As the color filters, filters of three primary colors, i.e. red, green, and blue, or three complementary colors, i.e. cyan, magenta, and yellow are used.

In the Bayer pattern, however, only a color signal of one color can be obtained in each pixel, and hence a process is carried out in which color signals of the other two colors missing in each pixel are demosaiced (interpolated). As the demosaicing method, a number of methods have been conventionally known, and bi-linear interpolation and bi-cubic interpolation are known as basic demosaicing methods.

The bi-linear interpolation and the bi-cubic interpolation can obtain favorable interpolation results in, for example, an image including a number of low-frequency components, but causes false color called moiré, which does not exist in a real subject, to appear in an image including a number of high-frequency components. The false color results from demosaicing using pixels in a direction other than the direction of an edge which a subject image originally has.

Thus, there has been proposed a demosaicing method using pixels along the direction of an edge which a subject image originally has. This demosaicing method using pixels along the direction of an edge can be broadly divided into two methods. In Japanese Laid-Open Patent Publication (Kokai) No. 2002-300590, there has been proposed a method in which the direction of an edge is determined using neighboring pixels, and interpolation is carried out along the edge without carrying out interpolation in such a direction as to cross the edge.

Also, in Japanese Laid-Open Patent Publication (Kokai) No. 2002-300590, there has been proposed a method in which saturations are calculated using a pixel targeted for interpolation and its neighboring pixels, and a direction in which the saturation is small is adaptively selected so as to improve an accuracy of edge direction determination. On the other hand, in Japanese Laid-Open Patent Publication (Kokai) No. 2008-035470, there has been proposed a method in which interpolation is carried out first on a direction-by-direction basis to generate a plurality of kinds of interpolation results, and then a direction in which an appropriate interpolation result has been obtained is determined and selected.

In Japanese Laid-Open Patent Publication (Kokai) No. 2008-035470, there has been proposed an interpolation method in which an evaluation value called peripheral similarity indicative of the homogeneity of a pixel targeted for interpolation and its neighboring pixels is introduced for the determination about the appropriateness of an interpolating direction, and a direction in which the homogeneity is high is selected as an edge direction.

However, according to the method disclosed in Japanese Laid-Open Patent Publication (Kokai) No. 2002-300590, although false colors in a gray-scale subject having high-frequency components can be reduced, there is concern that an interpolation error resulting from an erroneous judgment occurs in a case of a subject having high-frequency components whose base is colored.

On the other hand, according to the method disclosed in Japanese Laid-Open Patent Publication (Kokai) No. 2008-035470, there may be a case where a false color with low-frequency components having high homogeneity is selected by mistake.

SUMMARY OF THE INVENTION

The present invention provides an image processing apparatus and a control method therefor that enable a demosaicing process to be accurately carried out on a color image signal, as well as a computer-readable storage medium storing a program for implementing the method.

Accordingly, in a first aspect of the present invention, there is provided an image processing apparatus comprising an interpolation unit adapted to carry out an interpolation process in which, with respect to a color mosaic image signal related to each pixel generated by photoelectrical conversion of an optical image reflecting a subject image, signals of missing colors in the each pixel are interpolated using image signals related to pixels in predetermined directions around the each pixel, wherein the interpolation unit comprises a direction-by-direction interpolation unit that carries out the interpolation process in each of a plurality of predetermined directions, an evaluation unit that evaluates color image signals in the predetermined directions subjected to the interpolation process by the direction-by-direction interpolation unit, and a generation unit that generates a color image signal to be outputted as an interpolation process result based on a result of the evaluation by the evaluation unit, wherein the evaluation unit evaluates the color image signals in the predetermined directions subjected to the interpolation process with respect to homogeneity and signal intensity.

Accordingly, in a second aspect of the present invention, there is provided an image processing apparatus comprising an interpolation unit adapted to carry out an interpolation process in which, with respect to a color mosaic image signal related to each pixel generated by photoelectrical conversion of an optical image reflecting a subject image, signals of missing colors in the each pixel are interpolated using image signals related to pixels in predetermined directions around the each pixel, wherein the interpolation unit comprises a direction-by-direction interpolation unit that carries out the interpolation process in each of a plurality of predetermined directions, an evaluation unit that evaluates color image signals in the predetermined directions subjected to the interpolation process by the direction-by-direction interpolation unit, and a generation unit that generates a color image signal to be outputted as an interpolation process result based on a result of the evaluation by the evaluation unit, wherein before carrying out the interpolation process on the color mosaic image signal related to the each pixel generated by the photoelectrical conversion, the interpolation unit carries out a predetermined preliminary process on the color mosaic image signal, and the evaluation unit evaluates the color image signals in the respective predetermined directions subjected to the preliminary process and the interpolation process with respect to homogeneity and signal intensity.

Accordingly, in a third aspect of the present invention, there is provided a control method for an image processing apparatus, comprising an interpolation step of carrying out an interpolation process in which, with respect to a color mosaic image signal related to each pixel generated by photoelectrical conversion of an optical image reflecting a subject image, signals of missing colors in the each pixel are interpolated using image signals related to pixels in predetermined directions around the each pixel, wherein the interpolation step comprises a direction-by-direction interpolation step of carrying out the interpolation process in each of a plurality of predetermined directions, an evaluation step of evaluating color image signals in the predetermined directions subjected to the interpolation process in the direction-by-direction interpolation step, and a generation step of generating a color image signal to be outputted as an interpolation process result based on a result of the evaluation in the evaluation step, wherein in the evaluation step, the color image signals in the predetermined directions subjected to the interpolation process are evaluated with respect to homogeneity and signal intensity.

Accordingly, in a fourth aspect of the present invention, there is provided a control method for an image processing apparatus, comprising an interpolation step of carrying out an interpolation process in which, with respect to a color mosaic image signal related to each pixel generated by photoelectrical conversion of an optical image reflecting a subject image, signals of missing colors in the each pixel are interpolated using image signals related to pixels in predetermined directions around the each pixel, wherein the interpolation step comprises a direction-by-direction interpolation step of carrying out the interpolation process in each of a plurality of predetermined directions, an evaluation step of evaluating color image signals in the predetermined directions subjected to the interpolation process in the direction-by-direction interpolation step, and a generation unit step of generating a color image signal to be outputted as an interpolation process result based on a result of the evaluation in the evaluation step, wherein in the interpolation step, a predetermined preliminary process is carried out on the color mosaic image signal before the interpolation process is carried out on the color mosaic image signal related to the each pixel generated by the photoelectrical conversion, and in the evaluation step, the color image signals in the respective predetermined directions subjected to the preliminary process and the interpolation process are evaluated with respect to homogeneity and signal intensity.

Accordingly, in a fifth aspect of the present invention, there is provided a storage medium storing a program for causing a computer to execute a control method for an image processing apparatus.

Accordingly, in a sixth aspect of the present invention, there is provided a storage medium storing a program for causing a computer to execute a control method for an image processing apparatus.

According to the present invention, in the demosaicing process on a color mosaic image signal, homogeneity is used as evaluation criteria information for selecting a direction of a better interpolation result from interpolation results obtained by direction-by-direction interpolation.

For this reason, according to the present invention, an interpolation result (interpolating direction) crossing an edge of a subject is not selected, but a highly correlated interpolating direction, that is, an interpolating direction along an edge of a subject is selected.

Moreover, because evaluation is carried out with consideration given to signal intensity as well as homogeneity, a direction in which homogeneity is high but that is undesirable, for example, a direction in which a false color including low-frequency components exists can be prevented from being selected.

Further features of the present invention will become apparent from the following description of exemplary embodiments (with reference to the attached drawings).

BRIEF DESCRIPTION OF THE DRAWINGS

FIG. 3 is a block diagram schematically showing an arrangement of a V-direction interpolation unit and an H-direction interpolation unit (direction-by-direction interpolation units) of the demosaicing unit shown in FIG. 2.

FIG. 4 is a block diagram schematically showing a pixel arrangement of a Bayer pattern useful in explaining a direction-by-direction interpolation process.

FIG. 5 is a flowchart showing an evaluation value calculating process for a demosaicing process according to the first embodiment of the present invention.

FIG. 6 is a view showing a 3- by 3-pixel region useful in explaining the evaluation value calculating process for the demosaicing process according to the first embodiment of the present invention.

FIGS. 11A and 11B are views showing a 3- by 3-pixel region useful in explaining the evaluation value calculating process for the demosaicing process according to the second embodiment of the present invention.

FIGS. 18A and 18B are diagrams useful in explaining a demosaicing process carried out by the image pickup apparatus according to the fourth embodiment of the present invention.

FIG. 19 is a diagram schematically showing a pixel arrangement of a Bayer pattern.

DESCRIPTION OF THE EMBODIMENTS

The present invention will now be described in detail with reference to the drawings showing embodiments thereof.

Figure 1:
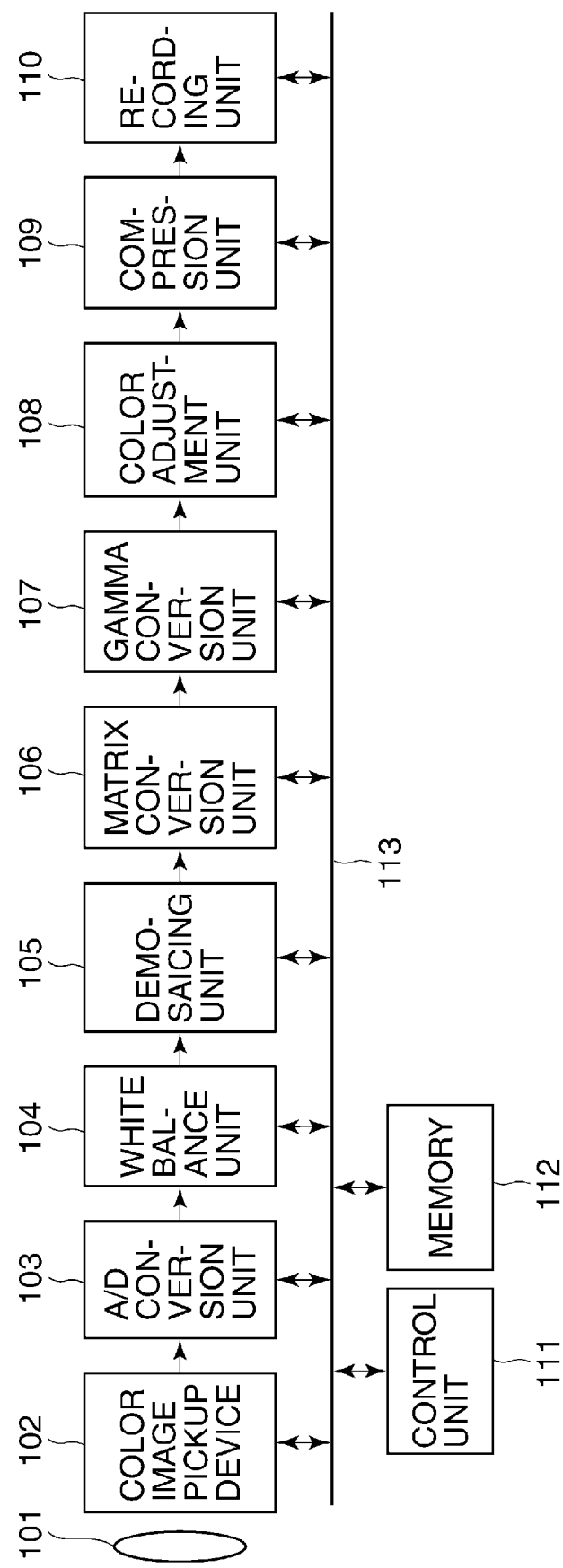
FIG. 1 is a block diagram schematically showing an arrangement of an image pickup apparatus according to first and second embodiments of the present invention.

FIG. 1 is a block diagram schematically showing an arrangement of an image processing apparatus according to a first embodiment of the present invention. The image processing apparatus according to the present embodiment has a function of effectively reducing false colors in Bayer image data taken by a color image pickup device 102.

Specifically, an optical image (subject image) reflecting a subject forms an image on the color image pickup device 102 via a taking lens 101, and is photoelectrically converted.

The color image pickup device 102 is configured as a single-chip color image pickup device having common primary-color filters. The primary-color filters are comprised of color filters of three primary colors R (red), G (green), and B (blue) having transmission dominant wavelength bands close to 650 nm, 550 nm, and 450 nm, respectively, and generates color planes corresponding to the respective bands of the three primary colors.

Figure 19:
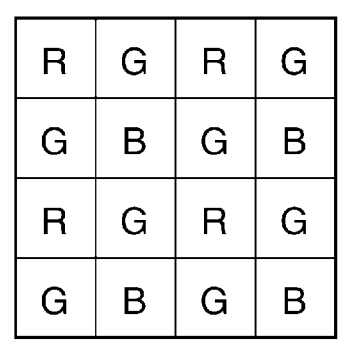

In the single-chip color image pickup device, these color filters are spatially arrayed on a pixel-by-pixel basis as shown in FIG. 19, and in each pixel, only light intensity in each single color plane can be obtained. Thus, a color mosaic image signal, that is, an image signal in which two colors among the three primary colors are missing in each pixel is outputted from the color image pickup device 102. An A/D conversion unit 103 converts the color mosaic image signal outputted as an analog voltage from the color image pickup device 102 into color digital image data.

A white balance unit 104 carries out a white balance process. Specifically, the white balance unit 104 multiplies the colors R, G, and B by gains so that the colors R, G, and B in an area that should be white can be isochromatic. By carrying out the white balance process prior to a demosaicing process, a higher saturation than the saturation of a false color can be prevented from being obtained by calculation due to color cast or the like when saturation is calculated by a demosaicing unit 105.

The demosaicing unit 105 interpolates color mosaic image data of missing two colors among the three primary colors in each pixel, thus generating a color image with color image data of full colors R, G, and B being present in all the pixels.

The color image data of each pixel is subjected to a matrix conversion process by a matrix conversion unit 106, and a gamma correction process by a gamma conversion unit 107. As a result, basic color image data is generated.

Then, a color adjustment unit 108 carries out various kinds of processes on the basic color image data so as to make an image look better. For example, the color adjustment unit 108 carries out various kinds of color adjustment processes such as noise reduction, saturation enhancement, hue correction, and edge enhancement. A compression unit 109 compresses the adjusted color image data using JPEG or the like to reduce the recording data size.

The processes carried out by the above devices from the color image pickup device 102 to the compression unit 109 are controlled by a control unit 111 via a bus 113. In providing the control, the control unit 111 uses a memory 112 as a need arises. The digital image data compressed by the compression unit 109 is recorded in a recording medium such as a flash memory by a recording unit 110 under the control of the control unit 111.

Next, a description will be given of the demosaicing process carried out by the demosaicing unit 105. The demosaicing unit 105 carries out interpolation in predetermined directions on a target pixel using its neighboring pixels first, and then selects a direction, thus generating a color image signal of the three primary colors R, G, and B as an interpolation process result for each pixel.

Specifically, a V-direction interpolation unit 202 and an H-direction interpolation unit 203 interpolate image data of missing colors in a V (vertical) direction and an H (horizontal) direction, respectively, to Bayer image data 201 of each pixel inputted to the demosaicing unit 105, and as a result, R, G and B image data in the V direction and the H direction is generated for each pixel.

Next, regarding the R, G and B image data of each pixel after the interpolation process in the vertical direction and the horizontal direction, a homogeneity calculation unit 204 and a homogeneity calculation unit 206 calculate homogeneity with respect to each pixel, and an intensity calculation unit 205 and an intensity calculation unit 207 calculate signal intensity with respect to each pixel.

Then, an evaluation value calculation unit 208 calculates final evaluation values separately in the vertical direction and the horizontal direction with respect to each pixel with consideration given to both homogeneity and signal intensity. A direction-selection/image-generation unit 209 compares the final evaluation value in the vertical direction and the final evaluation value in the horizontal direction with each other, and selects the vertical direction or the horizontal direction in which the evaluation value is greater. Then, the direction-selection/image-generation unit 209 generates final interpolation image data based on the R, G and B image data after the interpolation process in the selected direction, and outputs the final interpolation image data as post-interpolation RGB image data 210, that is, demosaiced data.

Referring next to FIG. 3, a description will be given of the direction-by-direction interpolation process carried out by the V-direction interpolation unit 202 and the H-direction interpolation unit 203. As shown in FIG. 3, the V-direction interpolation unit 202 has a V-direction G interpolation unit 202a and a V-direction RB interpolation unit 202b, and the H-direction interpolation unit 203 has an H-direction G interpolation unit 203a and an H-direction RB interpolation unit 203b.

In the V-direction interpolation unit 202, the V-direction G interpolation unit 202a interpolates a G signal (data) of a high frequency band first, and then the V-direction RB interpolation unit 202b interpolates R and B data. Likewise, in the H-direction interpolation unit 203, the H-direction G interpolation unit 203a interpolates G data of a high frequency band first, and then the H-direction RB interpolation unit 203b interpolates R and B data.

Referring next to FIG. 4, a concrete description will be given of the interpolation method. In a case where a G color is to be interpolated, when a target pixel is a pixel related to a G-color filter, G data of the pixel is outputted as it is (mathematical formula 1). In a case where a G color is to be interpolated for a pixel related to an R-color filter and a pixel related to a B-color filter, interpolation data is calculated using a mathematical formula 2 for the V direction and using a mathematical formula 3 for the H direction. It should be noted that G33, G43, and G44 in the mathematical formulas 1, 2, and 3 correspond to pixel symbols shown for the convenience of explanation in FIG. 4.

$$\begin{cases} G34 = G34 \\ G43 = G43 \end{cases} \quad \text{[Mathematical formula 1]}$$

$$\begin{cases} G33 = \dfrac{\begin{pmatrix} -R13 + 2 \cdot G23 + \\ 2 \cdot R33 + 2 \cdot G43 - R53 \end{pmatrix}}{4} \\ G44 = \dfrac{\begin{pmatrix} -B24 + 2 \cdot G34 + \\ 2 \cdot B44 + 2 \cdot G54 - B64 \end{pmatrix}}{4} \end{cases} \quad \text{[Mathematical formula 2]}$$

$$\begin{cases} G33 = \dfrac{\begin{pmatrix} -R31 + 2 \cdot G32 + \\ 2 \cdot R33 + 2 \cdot G34 - R35 \end{pmatrix}}{4} \\ G44 = \dfrac{\begin{pmatrix} -B42 + 2 \cdot G43 + \\ 2 \cdot B44 + 2 \cdot G45 - B36 \end{pmatrix}}{4} \end{cases} \quad \text{[Mathematical formula 3]}$$

In a case where an R color is to be interpolated, when a target pixel is a pixel related to an R color filter, R data of the pixel is outputted as it is (mathematical formula 4). In a case where an R color is to be interpolated for a pixel related to a G-color filter, interpolation data is calculated using a mathematical formula 5. In a case where an R color is to be interpolated for a pixel related to a B-color filter, interpolation data is calculated using a mathematical formula 6. For the interpolation of an R color, the same Mathematical formula is used in the V direction and the H direction.

A B color is interpolated in a manner similar to that in the interpolation of an R color. Specifically, a mathematical formula in which R in the mathematical formulas 4 to 6 is replaced with B is used.

$$\{R33 = R33 \quad \text{[Mathematical formula 4]}$$

$$\begin{cases} R34 = \dfrac{((R33 - G33) + (R35 - G35))}{2} + G34 \\ R43 = \dfrac{((R33 - G33) + (R53 - G53))}{2} + G43 \end{cases} \quad \text{[Mathematical formula 5]}$$

$$\begin{cases} R44 = \dfrac{((R33 - G33) + (R35 - G35) + (R53 - G53) + (R55 - G55))}{4} + G44 \end{cases} \quad \text{[Mathematical formula 6]}$$

Referring next to a flowchart of FIG. 5, a description will be given of an evaluation value calculation process.

Figure 2:
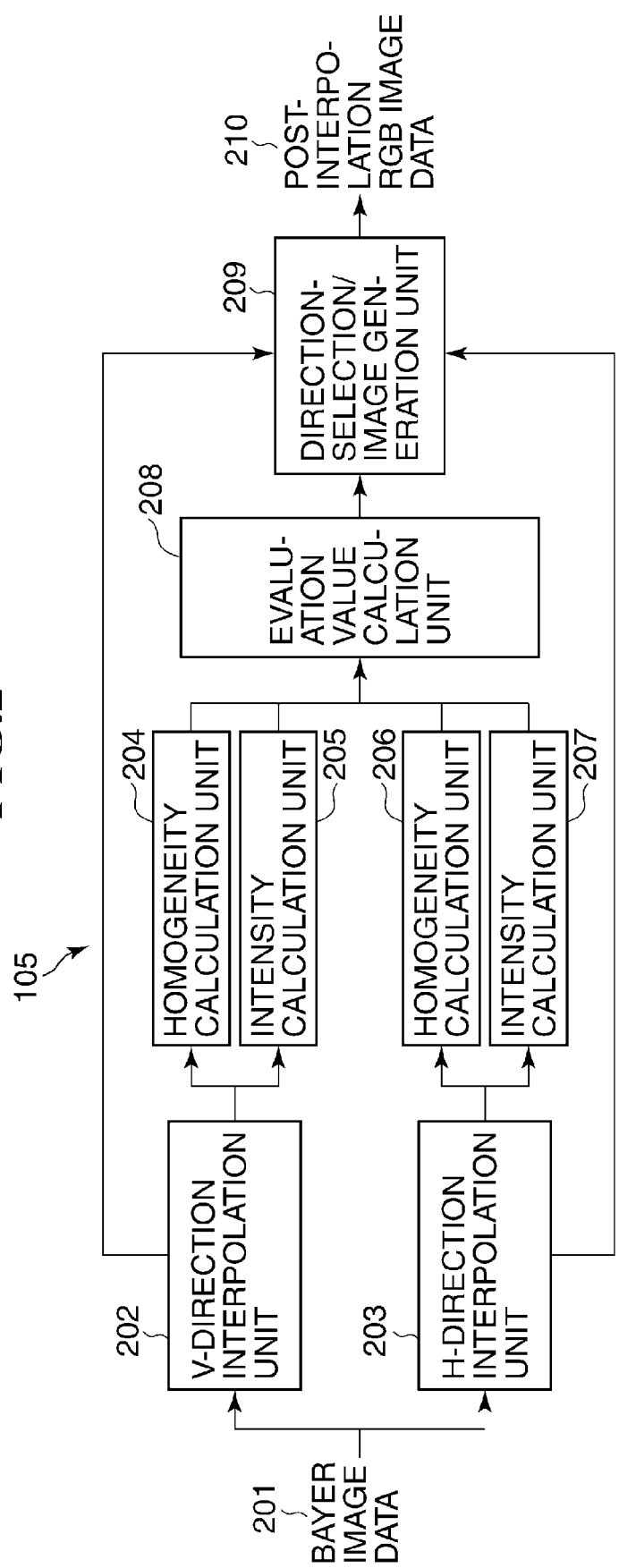
FIG. 2 is a block diagram schematically showing an arrangement of a demosaicing unit of the image pickup apparatus according to the first embodiment of the present invention.

The evaluation value calculation unit 208 in FIG. 2 converts V-direction RGB image data 202c in FIG. 3 obtained by interpolating missing colors in each pixel into color signals (values) of a uniform color space so that homogeneity and signal intensity can be easily calculated (S501). In the present embodiment, a L*a*b* color space using three-dimensional orthogonal coordinates is used as the uniform color space.

In converting the V-direction RGB image data 202c into L*a*b* values, first, the evaluation value calculation unit 208 converts the V-direction RGB image data 202c into values of an XYZ color system, which are tristimulus values of an object using mathematical formulas 7 to 9 below. To that end, an RGB color space must be set to be a certain type of RGB color space, and in the present embodiment, it is assumed that an RGB color space is set to be an sRGB color space, and a white color point is set at D65.

$$R'_{sRGB} = R'_{8bit} \div 255 \quad \text{[Mathematical formula 7]}$$
$$G'_{sRGB} = G'_{8bit} \div 255$$
$$B'_{sRGB} = B'_{8bit} \div 255$$

$$R'_{sRGB}, G'_{sRGB}, B'_{sRGB} \leq 0.04045 \quad \text{[Mathematical formula 8]}$$
$$R_{sRGB} = R'_{sRGB} \div 12.92$$
$$G_{sRGB} = G'_{sRGB} \div 12.92$$
$$B_{sRGB} = B'_{sRGB} \div 12.92$$

$$R'_{sRGB}, G'_{sRGB}, B'_{sRGB} > 0.04045$$
$$R_{sRGB} = [(R'_{sRGB} + 0.055)/1.055]^{2.4}$$
$$G_{sRGB} = [(G'_{sRGB} + 0.055)/1.055]^{2.4}$$
$$B_{sRGB} = [(B'_{sRGB} + 0.055)/1.055]^{2.4}$$

$$\begin{bmatrix} X_{D65} \\ Y_{D65} \\ Z_{D65} \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} \begin{bmatrix} R_{sRGB} \\ G_{sRGB} \\ B_{sRGB} \end{bmatrix} \quad \text{[Mathematical formula 9]}$$

Next, the evaluation value calculation unit 208 converts the tristimulus values of the object (the values of the XYZ color system) into L*a*b* values using the following mathematical formula 10.

$$L^* = 116(Y/Y_n)^{1/3} - 16$$

$$a^* = 500\{(X/X_n)^{1/3} - (Y/Y_n)^{1/3}\}$$

$$b^* = 200\{(Y/Y_n)^{1/3} - (Z/Z_n)^{1/3}\} \quad \text{[Mathematical formula 10]}$$

Here, Xn, Yn, and Zn are tristimulus values of a perfect reflecting diffuser, and it is stipulated that Yn=100. Also, an L* value (luminance value), an a* value (green-red chromaticity value), and a b* value (blue-yellow chromaticity value) are limited in terms of values X, Y, and Z that can be applied thereto. Actually, however, there exist colors other than predetermined colors, and in this case, the evaluation value calculation unit 208 obtains L*a*b* values using the following correction formula (mathematical formula 11).

$$L^* = 116f(Y/Y_n)^{1/3} - 16$$

$$a^* = 500\{f(X/X_n)^{1/3} - f(Y/Y_n)^{1/3}\}$$

$$b^* = 200\{f(Y/Y_n)^{1/3} - f(Z/Z_n)^{1/3}\} \quad \text{[Mathematical formula 11]}$$

It should be noted that the function $f$ in the mathematical formula 11 is expressed by the following mathematical formula 12.

$$f(X/X_n) = (X/X_n)^{1/3} \; X/X_n > 0.008856$$

$$f(X/X_n) = 7.787(X/X_n) + 16/116 X/X_n \leq 0.008856 \quad \text{[Mathematical Formula 12]}$$

The function $f$ (Y/Yn) and the function $f$ (Z/Zn) are also expressed similarly to the function $f$ (X/Xn) in the mathematical formula 12.

Next, the evaluation value calculation unit 208 calculates homogeneity (S502). In the present embodiment, the dispersion degree is used as a measure of homogeneity. The dispersion degree is calculated using 3- by 3-pixels centering on a target pixel (v22) as shown in FIG. 6. Although in the present embodiment, 3- by 3-pixels are used, 5- by 5-pixels, 7- by 7-pixels or the like may be used. Also, a color-difference dispersion parameter calculated by the following mathematical formula 13 is used as a dispersion parameter.

$$\Delta E_{ab} = \sqrt{(L_1 - L_2)^2 + (a_1 - a_2)^2 + (b_1 - b_2)^2} \quad \text{[Mathematical Formula 13]}$$

Although in the present embodiment, ΔEab is used as the color-difference dispersion parameter, ΔE94, ΔE2000, or the like may be used. Concrete methods of calculating ΔE94 and ΔE2000 are well known, and therefore, description thereof is omitted here.

When the color-difference dispersion parameter calculated using the mathematical formula 13 is used, the dispersion degree $\sigma_{v22}^2$ is calculated using the following mathematical formula 14.

$$\sigma_{v22}^2 = \frac{1}{n-1} \sum_{i=1}^{n} (\overline{\Delta E_{ab}} - \Delta E_{ab_i})^2 \qquad \text{[Mathematical formula 14]}$$

It should be noted that n in the mathematical formula 14 represents pixel number of pixels v11 to v33 shown in FIGS. 6, and n=9 (3×3=9 pixels).

Next, the evaluation value calculation unit 208 calculates signal intensity (S503). In the present embodiment, saturation is used as a measure of signal intensity. As is the case with the dispersion degree, saturation is calculated using the 3- by 3-pixels centering on the target pixel. A saturation calculation mathematical formula is expressed by the following mathematical formula 15.

$$C = \sqrt{(a_1 - a_2)^2 + (b_1 - b_2)^2} \qquad \text{[Mathematical Formula 15]}$$

Thus, an evaluation value based on the saturation in the pixel v22 is an average of total nine pixels consisting of the target pixel and the neighboring eight pixels, and is expressed by the following mathematical formula 16.

$$C_{v22} = \frac{1}{n} \sum_{i=1}^{n} (C_i) \qquad \text{[Mathematical formula 16]}$$

The evaluation value calculation unit 208 carries out the processes in the steps S501 to S503 described above with respect to all the pixels of a V image (V-direction RGB data 202c in FIG. 3). Also, the evaluation value calculation unit 208 carries out processes similar to the processes in the steps S501 to S503 described above with respect to all the pixels of an H image (H-direction RGB data 203c in FIG. 3) (S504 to S506).

Upon completing the above processes, the evaluation value calculation unit 208 calculates final evaluation values (S507). In calculating the final evaluation values, first, the evaluation value calculation unit 208 calculates evaluation values based on the degrees of dispersion using the following mathematical formula 17.

$$Cvar_h = \frac{\sigma_h^2}{\sigma_h^2 + \sigma_v^2}$$

$$Cvar_v = \frac{\sigma_v^2}{\sigma_h^2 + \sigma_v^2} \qquad \text{[Mathematical formula 17]}$$

Here, $Cvar_h$ and $Cvar_v$ represent evaluation values based on the degrees of dispersion. Next, the evaluation value calculation unit 208 calculates evaluation values based on saturations using the following mathematical formula 18.

$$Cchroma_h = \frac{chroma_h}{chroma_h + chroma_v} \qquad \text{[Mathematical formula 18]}$$

$$Cchroma_v = \frac{chroma_v}{chroma_h + chroma_v}$$

Here, $Cchroma_h$ and $Cchroma_v$ represent evaluation values based on saturations. Next, the evaluation value calculation unit 208 calculates final evaluation values $C_h$ and $C_v$ using the following mathematical formula 19.

$$C_h = \alpha \cdot Cvar_h + (\alpha - 1) \cdot Cchroma_h$$

$$C_v = \alpha \cdot Cvar_v + (\alpha - 1) \cdot Cchroma_v \qquad \text{[Mathematical formula 19]}$$

Here, α is a weighting coefficient, which determines how the dispersion degree and the saturation are balanced in consideration. In the present embodiment, it is assumed that α=0.5.

As a result of the above processes, the evaluation value $C_h$ or $C_v$ is calculated with respect to each pixel, and accordingly, a two-dimensional plane of evaluation values is generated (S507).

Incidentally, final interpolation values are determined by evaluation values, and hence when evaluation values of neighboring pixels vary greatly, this may result in degradation of image quality such as tone jump.

Figure 7A:
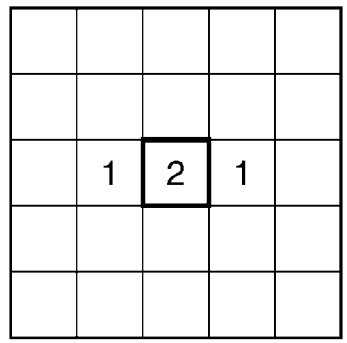
FIGS. 7A and 7B are views showing filter coefficients of an LPF used in calculating evaluation values for the demosaicing process.
Figure 7B:
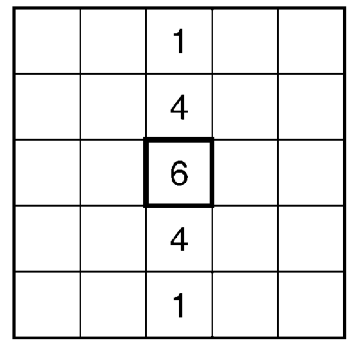

Thus, the evaluation value calculation unit 208 makes the generated evaluation value plane pass through a low-pass filter (hereinafter referred to as the "LPF") (S508). Regarding a filter coefficient of the LPF, either a filter length of three pixels [1, 2, 1] or a filter length of five pixels [1, 4, 6, 4, 1] may be used as shown in FIGS. 7A and 7B, and in either case, it is preferred that the evaluation value plane is filtered both vertically and horizontally.

When the evaluation values are thus calculated by the evaluation value calculation unit 208, the direction-selection/image-generation unit 209 selects one of the vertical and horizontal directions based on the evaluation values, and carries out the above filtering process on interpolation data in the selected direction. As a result, the direction-selection/image-generation unit 209 generates final RGB interpolation image data in which R, G, and B color components exist in all the pixels, and outputs the same as post-interpolation RGB image data 210 (demosaiced data).

Figure 8:
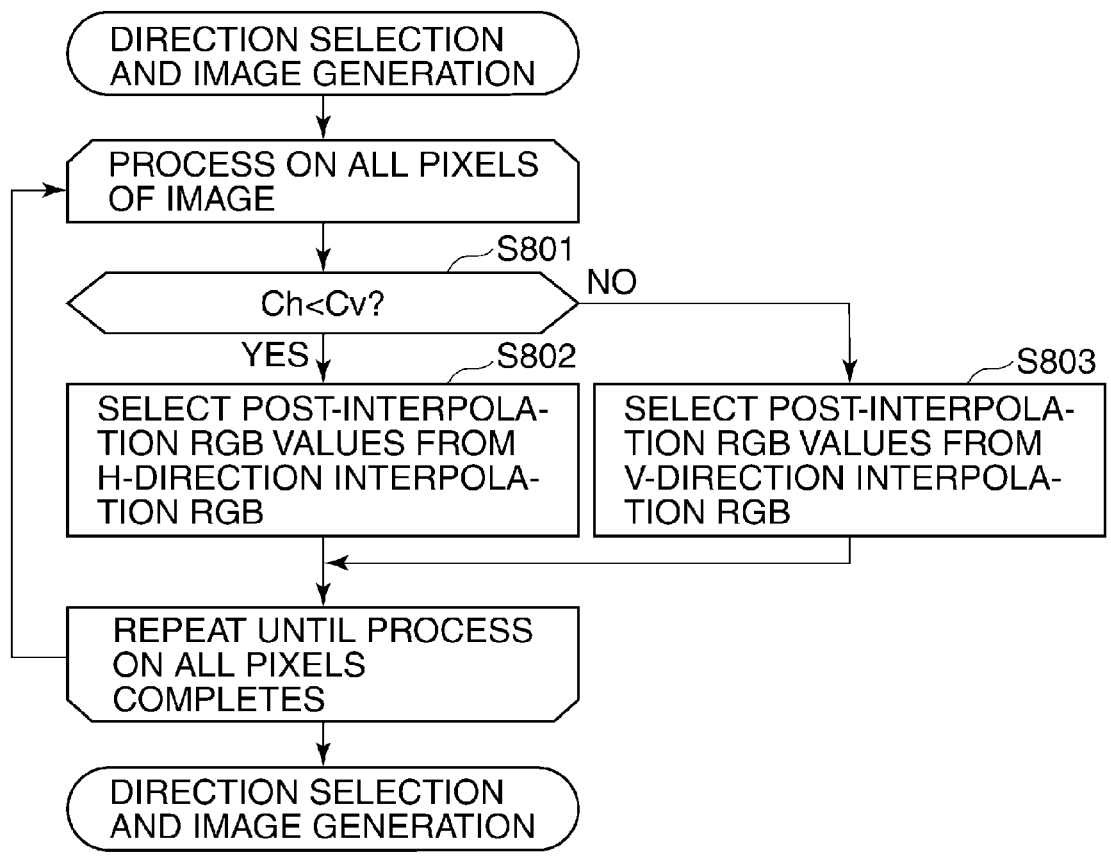
FIG. 8 is a flowchart showing a direction-selection/image-generation process in the demosaicing process.

Referring next to FIG. 8, a concrete description will be given of a direction-selection and interpolation image-generation method.

With respect to each pixel, the direction-selection/image-generation unit 209 compares the evaluation value $C_h$ related to the interpolation in the H direction and the evaluation value $C_v$ related to the interpolation in the V direction with each other, and determines whether or not the evaluation value $C_h$<the evaluation value $C_v$ (S801). When, as a result, the evaluation value $C_h$<the evaluation value $C_v$, the direction-selection/image-generation unit 209 selects R, G, B interpolation data related to the interpolation in the H direction, carries out the above filtering process on the R, G, B interpolation data, and outputs the same as post-interpolation RGB image data 210 (S802).

On the other hand, when the evaluation value $C_h$≥the evaluation value $C_v$, the direction-selection/image-generation unit 209 selects R, G, B interpolation data related to the interpolation in the V direction, carries out the above filtering process on the R, G, B interpolation data, and outputs the same as post-interpolation RGB image data 210 (S803).

As described above, in the first embodiment, the degree of color difference dispersion is used as homogeneity as a parameter for calculating evaluation values for selecting a direction to be actually used (interpolation result) from interpolation results obtained by direction-by-direction interpolation. For this reason, an interpolation result in such a direction as to cross an edge of a subject is not selected, but an interpolation result in a highly correlated direction, that is, along an edge of a subject is selected.

Moreover, because saturation as intensity as well as homogeneity is used as a parameter for calculating evaluation values, the possibility that a direction in which homogeneity is good but that is undesirable, for example, a direction in which a false color including low-frequency components exists is selected can be decreased.

In the first embodiment, a direction to be actually used (interpolation result) is adaptively selected from interpolation results obtained by carrying out interpolation in the vertical (V) and horizontal (H) directions separately. On the other hand, in a second embodiment, interpolation is carried out in a plurality of directions, not in one limited direction, and interpolation images in the respective directions are combined according to a ratio of obtained evaluation values (ratio of directions).

A detailed description will now be given of the second embodiment of the present invention.

Arrangements of signal units of an image pickup apparatus according to the second embodiment are substantially the same as those of the first embodiment described with reference to FIG. 1, and therefore, description thereof is omitted, but the second embodiment differs from the first embodiment in an arrangement of the demosaicing unit 105.

Figure 9:
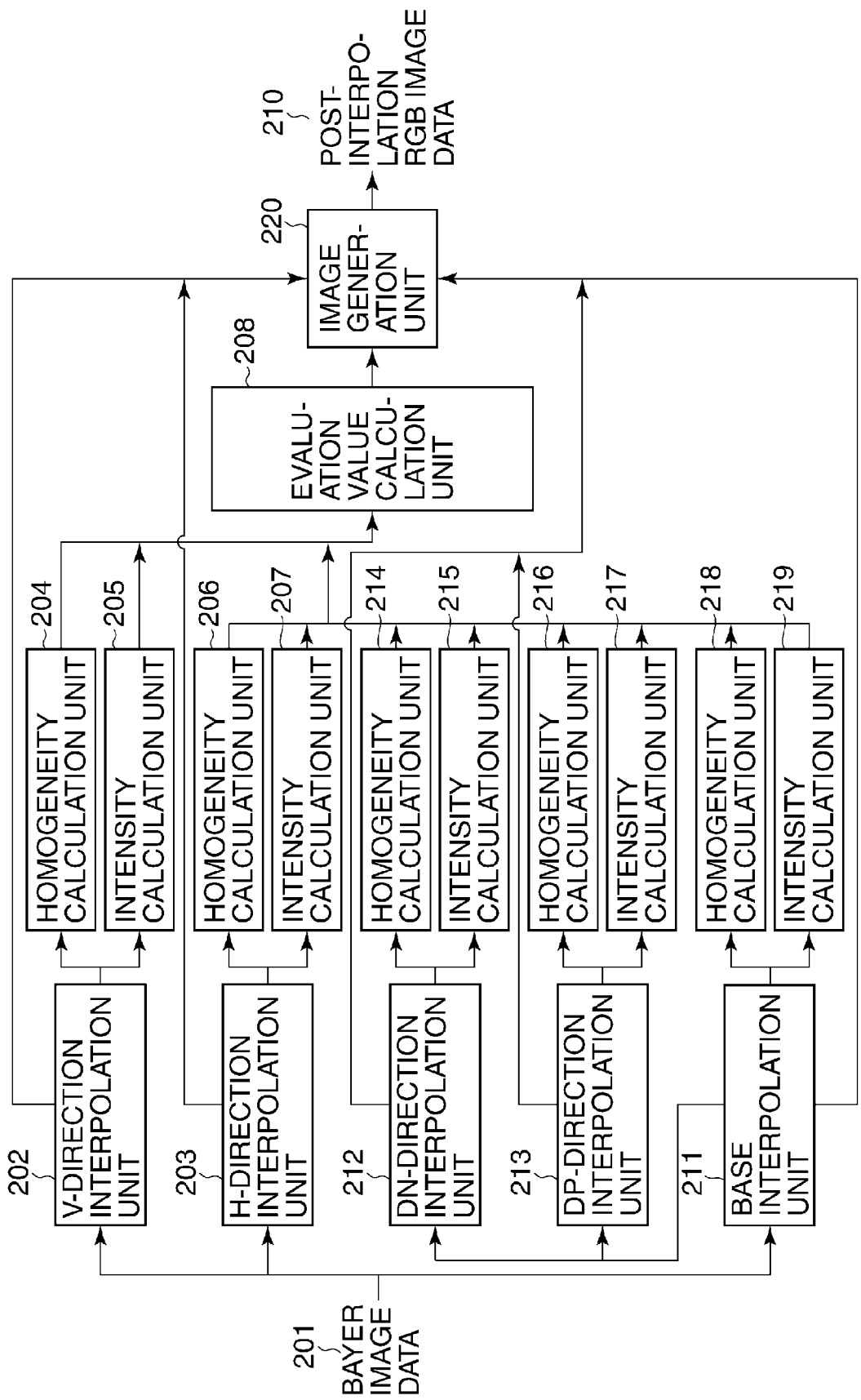
FIG. 9 is a block diagram schematically showing an arrangement of a demosaicing unit according to the second embodiment of the present invention.

FIG. 9 is a block diagram showing in detail the arrangement of the demosaicing unit 105 according to the second embodiment.

In the first embodiment, the two patterns of the H direction and the V direction are prepared for the direction-by-direction interpolation. However, depending on a form of a subject, it may be preferred that interpolation is carried out in directions other than those two directions.

Thus, a basic interpolation unit 211 carries out interpolation in a plurality of directions. In this case, there are some possible interpolation methods, and in the present embodiment, a method described hereafter is used.

As is the case with the V-direction interpolation unit 202 and the H-direction interpolation unit 203, the basic interpolation unit 211 carries out interpolation of R/B after interpolation of G.

Referring to FIG. 4, in interpolation of G, the basic interpolation unit 211 outputs pixel values related to G-color filters as it is as expressed in the mathematical formula 1, and interpolates G values at positions of pixels related to an R-color filter and a B-color filter using the following mathematical formula.

$$\begin{cases} G33 = \dfrac{(G23 + G32 + G34 + G43)}{4} \\ G44 = \dfrac{(G34 + G43 + G45 + G54)}{4} \end{cases} \quad \text{[Mathematical formula 20]}$$

The basic interpolation unit 211 interpolates R and B using the mathematical formulas 4 to 6.

Further, in addition to the interpolation in the H direction and the V direction, interpolation is carried out in a plurality of directions, that is, diagonal directions. As a result, natural interpolation results can be obtained for diagonal edges. A DP (diagonal positive) direction of which gradient is positive and a DN (diagonal negative) direction of which gradient is negative are prepared as diagonal directions. A DP-direction interpolation unit 213 and a DN-direction interpolation unit 212 carry out interpolation in the DP direction and the DN direction, respectively.

The G interpolation by the DP-direction interpolation unit 213 and the DN-direction interpolation unit 212 uses G interpolation results obtained by the basic interpolation unit 211. Regarding a method for R interpolation, R interpolation values at R pixel positions are calculated using the mathematical formula 4, and R interpolation values at G pixel positions are calculated using the mathematical formula 5.

R interpolation values at B pixel positions are calculated using the following mathematical formula.

$$\begin{cases} R44P = \dfrac{(R35 + R53)/2 +}{(-G35 + 2 \cdot G44 - G53)/2} \\ R44N = \dfrac{(R33 + R55)/2 +}{(-G33 + 2 \cdot G44 - G55)/2} \end{cases} \quad \text{[Mathematical formula 21]}$$

B interpolation at B pixel positions is carried out in a manner similar to that in the R interpolation, and R is replaced with B in the mathematical formulas 4, 5 and 21.

Here, although the present embodiment has been described assuming that the diagonal angle is 0° in the horizontal direction, 45° in the DP direction, and 135° in the DN direction, the present invention is not limited to this, but an arbitrary diagonal angle may be used. For example, diagonal angles may be more finely divided so as to additionally carry out interpolation in a direction of 22.5°.

Post-interpolation RGB images are obtained as a result of the interpolation in the V direction, the H direction, unspecified directions (base), the DP direction, and the DN direction in the above described process. The evaluation value calculation unit 208 calculates evaluation values with respect to these post-interpolation RGB images.

Figure 10:
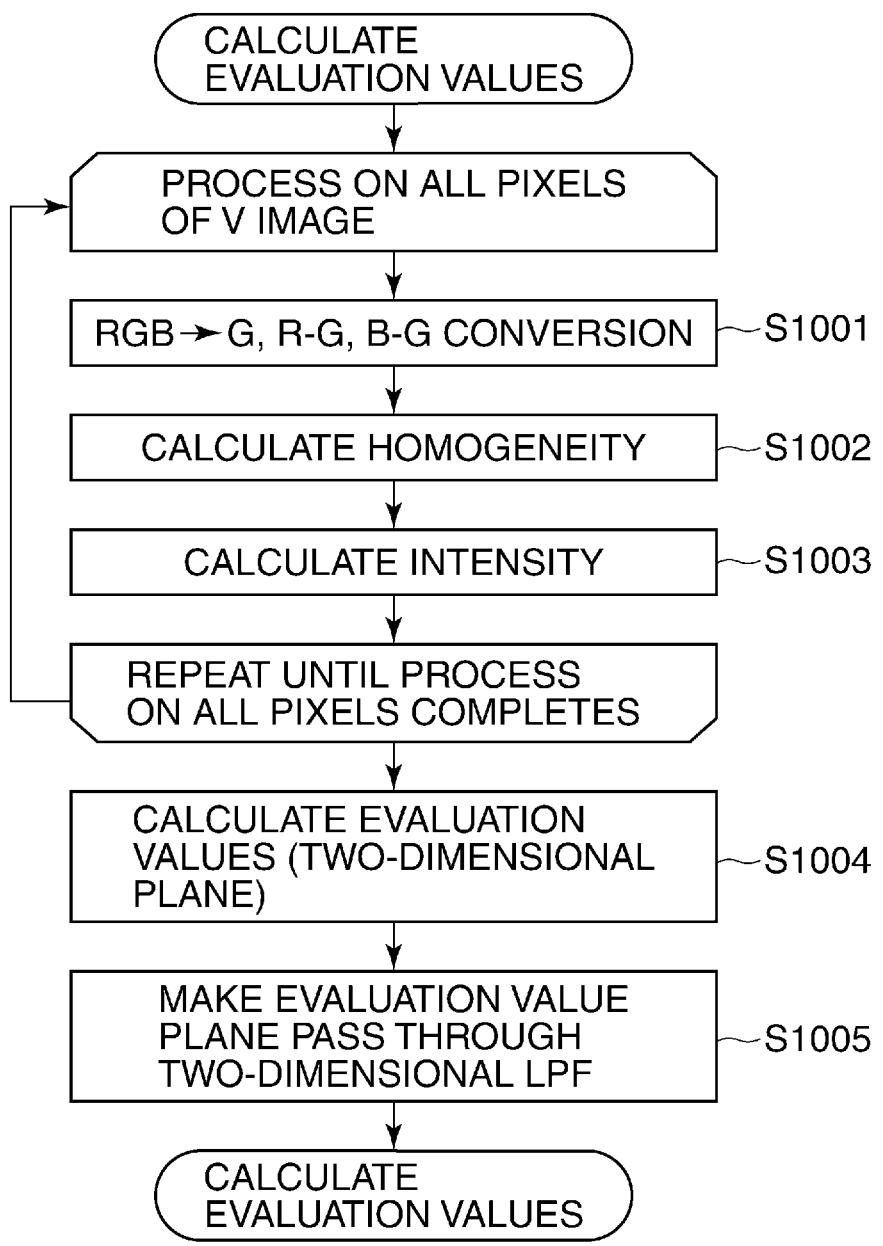
FIG. 10 is a flowchart showing an evaluation value calculating process for a demosaicing process according to the second embodiment of the present invention.

FIG. 10 is a flowchart showing an evaluation value calculating process according to the second embodiment. Although in FIG. 10, there is shown only the evaluation value calculating process for V images, the same evaluation value calculating process as that in FIG. 10 is carried out for images in the H direction, unspecified directions (base), the DP direction, and the DN direction as well.

In the first embodiment, a L*a*b* uniform color space is used to calculate the degree of color difference dispersion as homogeneity. However, a large amount of calculation is required for conversion into L*a*b* values. For this reason, in the second embodiment, homogeneity and intensity are calculated in a G, R-G, B-G color space in which a G signal is used as it is in place of L*, R-G is used in place of a* and b*, and B-G is a color difference signal (S1001 and S1002).

Moreover, in a homogeneity calculating process in the S1002, the dispersion degree is used as a measure of homogeneity as is the case with the first embodiment, but in the homogeneity calculating process in the S1002, the dispersion degree is calculated in a different way than in the first embodiment. In this case, ΔEab is used as a color difference dispersion parameter. On the other hand, in the second embodiment, G, R-G, and B-G are used, the dispersion degree is calculated in relation to these dispersion parameters, and the largest dispersion degree is selected from them.

Moreover, in the first embodiment, the dispersion degree is calculated using a total of nine pixels consisting of a target pixel and its neighboring eight pixels. On the other hand, in the second embodiment, as shown in FIG. 11A, in a case of the H direction, a total of three pixels consisting of a target pixel and its two neighboring pixels in the H direction are used, and the degrees of dispersion $\sigma_{h1}$, $\sigma_{h1}^2$, $\sigma_{h2}^2$, and $\sigma_{h3}^2$ are calculated using h12, h22, and h32 as respective target pixels. Similarly, in the second embodiment, as shown in FIG. 11B, in a case of the V direction, a total of three pixels consisting of a target pixel and its neighboring two pixels in the V direction are used, and the degrees of dispersion $\sigma_{v1}^2$, $\sigma_{v2}^2$, and $\sigma_{v3}^2$ are calculated using v21, v22, and v23 as respective target pixels.

Figure 12:
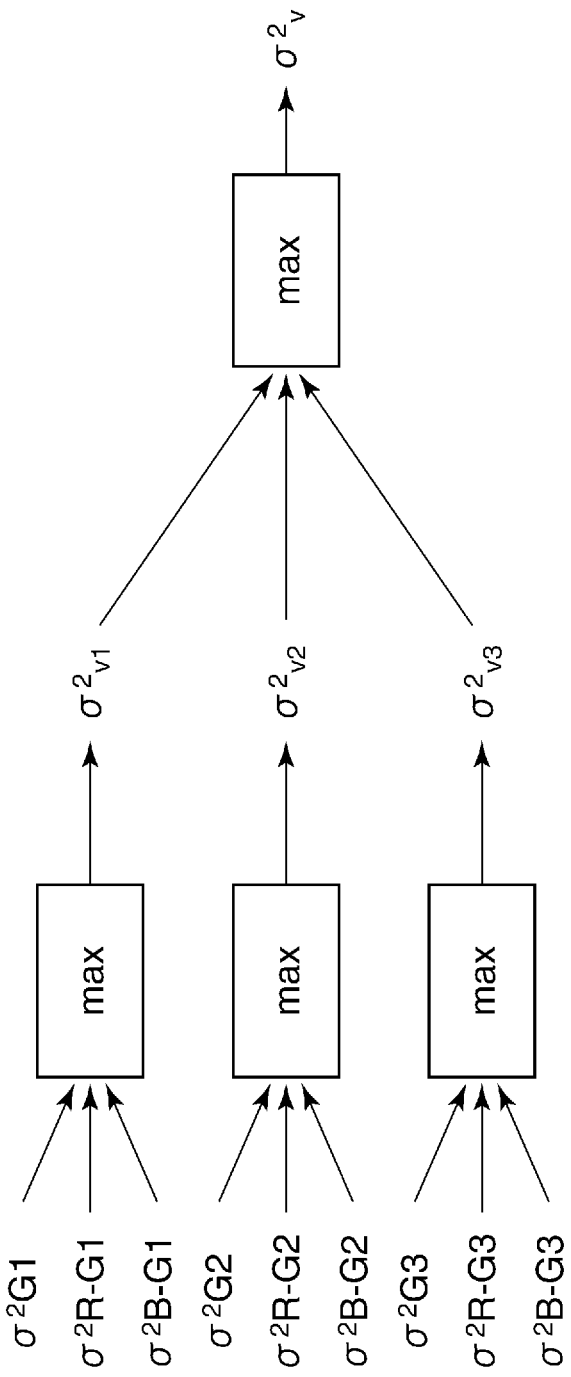
FIG. 12 is a conceptual diagram useful in explaining a dispersion degree as an evaluation value for the demosaicing process according to the second embodiment of the present invention.

Then, the evaluation value calculation unit 208 obtains the largest dispersion degree among the degrees of dispersion $\sigma_{h1}^2$, $\sigma_{h2}^2$, and $\sigma_{h3}^2$, or $\sigma_{v1}^2$, $\sigma_{v2}^2$, and $\sigma_{v3}^2$ as the dispersion values which are evaluation values (see FIG. 12).

In a case of the DP direction, the dispersion values are obtained using a total of three pixels consisting of a target pixel and its neighboring two pixels on the upper right and lower left of the target pixel, and in a case of the DN direction, the dispersion values are obtained using a total of three pixels consisting of a target pixel and its neighboring two pixels on the upper left and lower right of the target pixel. In a case of unspecified directions, the dispersion values are obtained using a total of nine pixels consisting of a target pixel and its neighboring eight pixels.

Then, the evaluation value calculation unit 208 calculates intensity (S1003). As is the case with the first embodiment, saturation is used as a measure of intensity, but in the second embodiment, intensity is calculated in a different way than in the first embodiment.

Specifically, in the first embodiment, the evaluation value calculation unit 208 obtains the average of saturations of a total of nine pixels consisting of a target pixel and its neighboring eight pixels as an evaluation value of intensity, but in the second embodiment, with respect to the H direction and the V direction, the evaluation value calculation unit 208 obtains the largest value among saturations of the above respective target pixels as an evaluation value of intensity.

The evaluation value calculation unit 208 carries out the processes in the S1001 to the S1003 with respect to all the pixels of images related to the V direction, the H direction, unspecified directions, the DN direction, and the DP direction.

Upon completing the processes in the S1001 to the S1003, the evaluation value calculation unit 208 calculates final evaluation values (S1004). In this case, first, the evaluation value calculation unit 208 calculates evaluation values based on the degrees of dispersion using the following mathematical formula 22.

$$Cvar_h = \frac{\sigma_h^2}{\sigma_h^2 + \sigma_v^2 + \sigma_{base}^2 + \sigma_{dn}^2 + \sigma_{dp}^2}$$ [Mathematical formula 22]

$$Cvar_v = \frac{\sigma_v^2}{\sigma_h^2 + \sigma_v^2 + \sigma_{base}^2 + \sigma_{dn}^2 + \sigma_{dp}^2}$$

$$Cvar_{base} = \frac{\sigma_{base}^2}{\sigma_h^2 + \sigma_v^2 + \sigma_{base}^2 + \sigma_{dn}^2 + \sigma_{dp}^2}$$

$$Cvar_{dn} = \frac{\sigma_{dn}^2}{\sigma_h^2 + \sigma_v^2 + \sigma_{base}^2 + \sigma_{dn}^2 + \sigma_{dp}^2}$$

$$Cvar_{dp} = \frac{\sigma_{dp}^2}{\sigma_h^2 + \sigma_v^2 + \sigma_{base}^2 + \sigma_{dn}^2 + \sigma_{dp}^2}$$

Here, $Cvar_h$, $Cvar_v$, $Cvar_{base}$, $Cvar_{dn}$, and $Cvar_{dp}$ represent evaluation values based on the degrees of dispersion. Then, the evaluation value calculation unit 208 calculates evaluation values based on saturations using the following mathematical formula 23.

$$Cchroma_h = \frac{chroma_h}{chroma_h + chroma_v + chroma_{base} + chroma_{dn} + chroma_{dp}}$$ [Mathematical formula 23]

$$Cchroma_v = \frac{chroma_v}{chroma_h + chroma_v + chroma_{base} + chroma_{dn} + chroma_{dp}}$$

$$Cchroma_{base} = \frac{chroma_{base}}{chroma_h + chroma_v + chroma_{base} + chroma_{dn} + chroma_{dp}}$$

$$Cchroma_{dn} = \frac{chroma_{dn}}{chroma_h + chroma_v + chroma_{base} + chroma_{dn} + chroma_{dp}}$$

$$Cchroma_{dp} = \frac{chroma_{dp}}{chroma_h + chroma_v + chroma_{base} + chroma_{dn} + chroma_{dp}}$$

Here, $Cchroma_h$, $Cchroma_v$, $Cchroma_{base}$, $Cchroma_{dn}$, and $Cchroma_{dp}$ represent evaluation values based on saturations. Then, the evaluation value calculation unit 208 calculates final evaluation values $C_h$, $C_v$, $C_{base}$, $C_{dn}$, and $C_{dp}$ using the following mathematical formula 24.

$$C_h = \alpha \cdot Cvar_h + (\alpha-1) \cdot Cchroma_h$$

$$C_v = \alpha \cdot Cvar_v + (\alpha-1) \cdot Cchroma_v$$

$$C_{base} = \alpha \cdot Cvar_{base} + (\alpha-1) \cdot Cchroma_{base}$$

$$C_{dn} = \alpha \cdot Cvar_{dn} + (\alpha-1) \cdot Cchroma_{dn}$$

$$C_{dp} = \alpha \cdot Cvar_{dp} + (\alpha-1) \cdot Cchroma_{dp}$$ [Mathematical formula 24]

Here, $\alpha$ is a weighting coefficient, which determines how the dispersion degree and the saturation are balanced in consideration. In the present embodiment, it is assumed that $\alpha=0.5$.

As a result of the above processes, the evaluation values $C_h$, $C_v$, $C_{base}$, $C_{dn}$, and $C_{dp}$ are calculated with respect to each pixel, and accordingly, a two-dimensional plane of the evaluation values is generated. Also, as is the case with the first embodiment, the evaluation value calculation unit 208 makes the evaluation value plane pass through the LPF (S1005).

When the evaluation values are thus calculated by the evaluation value calculation unit 208, an image generation unit 220 combines the interpolation images according to the ratio of the evaluation values. The combination ratio is calculated according to the following mathematical formula 25.

$$Cratio_h = \frac{\frac{1}{c_h}}{\frac{1}{c_h}+\frac{1}{c_v}+\frac{1}{c_{base}}+\frac{1}{c_{dn}}+\frac{1}{c_{dp}}}$$ [Mathematical formula 25]

$$Cratio_v = \frac{\frac{1}{c_v}}{\frac{1}{c_h}+\frac{1}{c_v}+\frac{1}{c_{base}}+\frac{1}{c_{dn}}+\frac{1}{c_{dp}}}$$

$$Cratio_{base} = \frac{\frac{1}{c_{base}}}{\frac{1}{c_h}+\frac{1}{c_v}+\frac{1}{c_{base}}+\frac{1}{c_{dn}}+\frac{1}{c_{dp}}}$$

$$Cratio_{dn} = \frac{\frac{1}{c_{dn}}}{\frac{1}{c_h}+\frac{1}{c_v}+\frac{1}{c_{base}}+\frac{1}{c_{dn}}+\frac{1}{c_{dp}}}$$

$$Cratio_{dp} = \frac{\frac{1}{c_{dp}}}{\frac{1}{c_h}+\frac{1}{c_v}+\frac{1}{c_{base}}+\frac{1}{c_{dn}}+\frac{1}{c_{dp}}}$$

As a result, final interpolation values are obtained according to the following mathematical formula 26.

$$\begin{cases} R = c_h \cdot R_h + c_v \cdot R_v + c_{base} \cdot R_{base} + \\ \quad\quad c_{dn} \cdot R_{dn} + c_{dp} \cdot R_{dp} \\ G = c_h \cdot G_h + c_v \cdot G_v + c_{base} \cdot G_{base} + \\ \quad\quad c_{dn} \cdot G_{dn} + c_{dp} \cdot G_{dp} \\ B = c_h \cdot B_h + c_v \cdot B_v + c_{base} \cdot B_{base} + \\ \quad\quad c_{dn} \cdot B_{dn} + c_{dp} \cdot B_{dp} \end{cases}$$ [Mathematical formula 26]

By carrying out the above processes on all the pixels, post-interpolation RGB image data 210 is outputted from the image generation unit 220.

As described above, in the second embodiment, a direction to be actually used (interpolation result) is not adaptively selected from results obtained by direction-by-direction interpolation as in the first embodiment, but final interpolation images are generated according to combination ratios. Thus, in the second embodiment, even when different directions are selected for neighboring pixels, values of the neighboring pixels do not differ greatly, and hence an image that is visually natural can be obtained.

It should be noted that in the generation of interpolation images according to combination ratios as described above, when the percentage of correct directions is not higher as compared with other directions, combination with images in other directions may have an adversary effect. Thus, in the second embodiment, the percentage of correct directions is increased by using the method in which the largest values are selected in the dispersion degree and saturation calculating process as described above.

Figure 13:
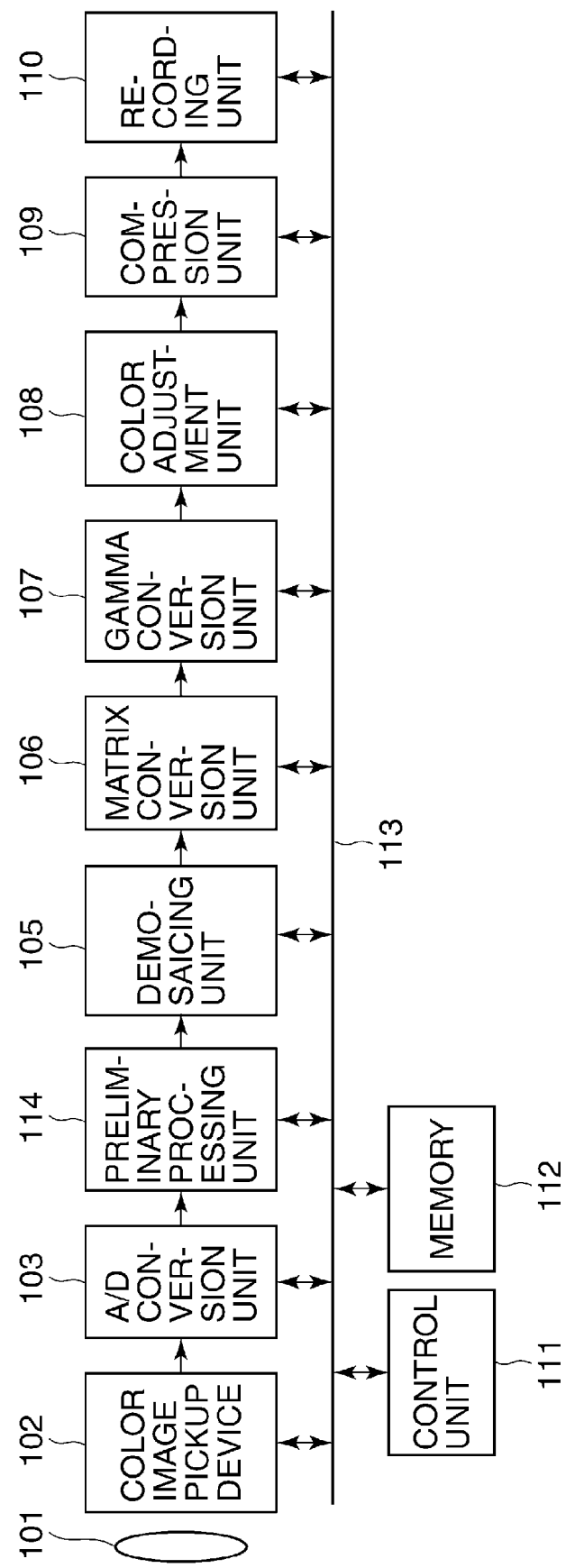
FIG. 13 is a block diagram schematically showing an arrangement of an image pickup apparatus according to a third embodiment of the present invention.

As shown in FIG. 13, a third embodiment differs from the first and second embodiments in that there is provided a preliminary processing unit 114, and a predetermined preliminary process including a white balance process are carried out before the demosaicing process is carried out by the demosaicing unit 105. The preliminary process is carried out so as to enhance the reliability of the demosaicing unit 105 when it calculates the degrees of dispersion and saturations.

Figure 14:
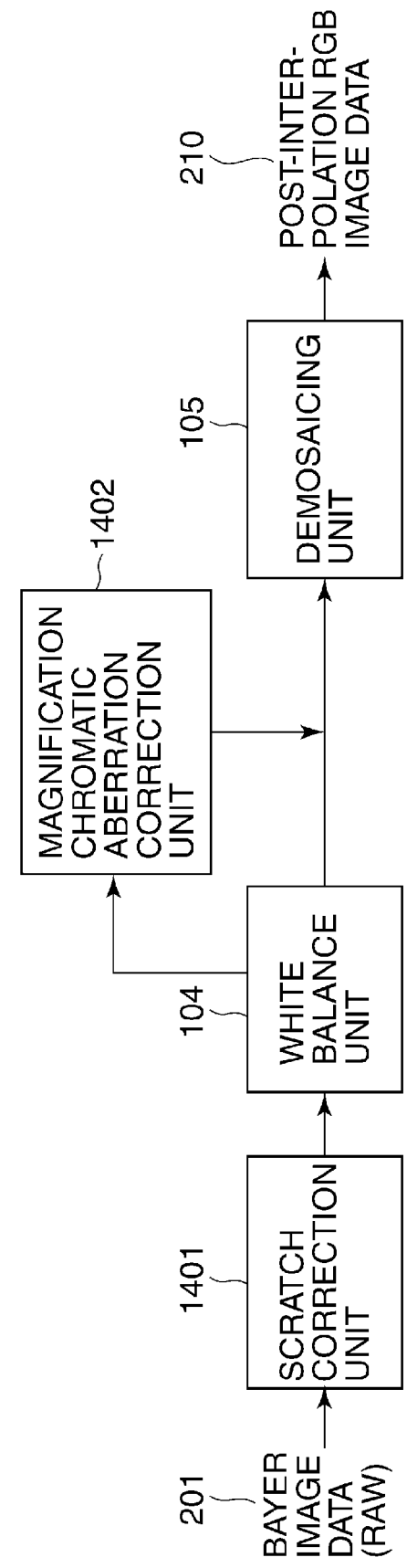
FIG. 14 is a block diagram schematically showing an arrangement of a preliminary processing unit for a demosaicing process according to the third embodiment of the present invention.

As shown in FIG. 14, the preliminary processing unit 114 has a scratch correction unit 1401 and a magnification chromatic aberration correction unit 1402 as well as the same white-balance unit 104 as that in the first embodiment.

A scratch correction process carried out by the scratch correction unit 1401 is significant in terms of the following. Specifically, the image pickup device 102 may have a scratched defective pixel, which is produced in the manufacturing process or produced due to variations in characteristics of internal analog circuits.

When the image pickup device 102 has a scratched defective pixel, signal charge other than from signal charge corresponding to an actual subject image is accumulated in the scratched defective pixel and outputted as an image signal that looks like a scratch.

When a scratched defective pixel is a target pixel, the reliabilities of the dispersion degree and saturations calculated by the demosaicing unit 105 degrade, and there is concern that incorrect directions are selected.

Thus, the scratch correction unit 1401 of the preliminary processing unit 114 carries out a scratch correction process. As a method for this scratch correction process, a variety of methods may be used such as a method in which a position of a scratched defective pixel is recorded in memory in advance, and when a scratch is to be corrected for, the scratched pixel is replaced with a pixel value related to the nearest pixel in the same color.

Figure 15:
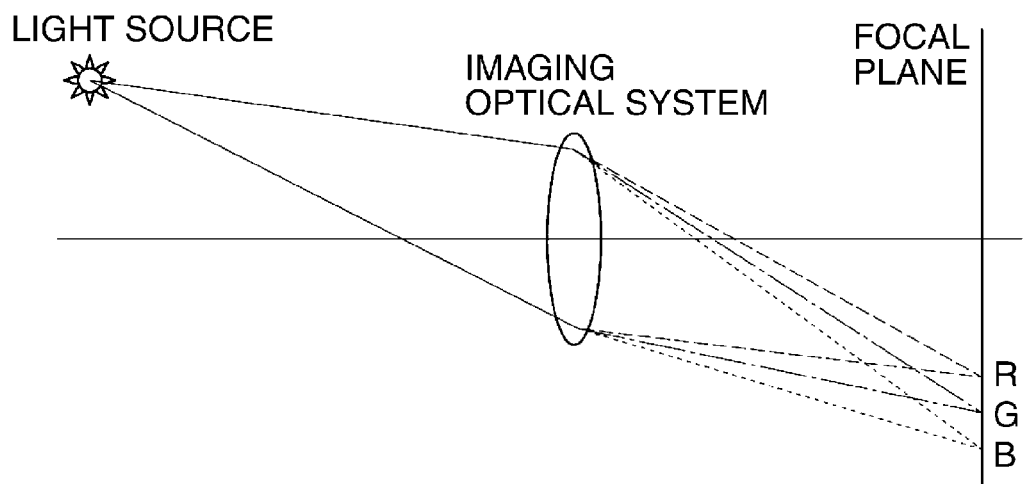
FIG. 15 is a conceptual diagram useful in explaining a principle on which chromatic aberration of magnification occurs.
Figure 16:
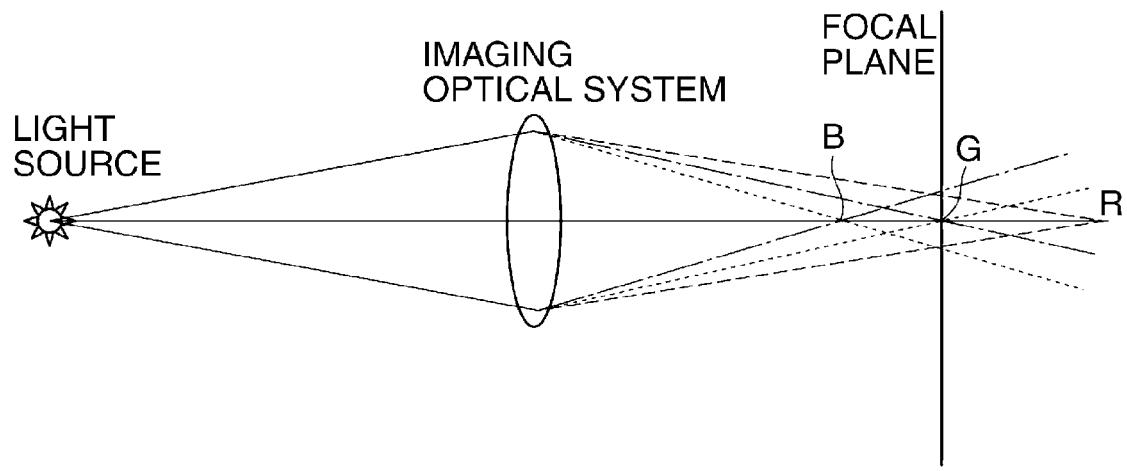
FIG. 16 is a conceptual diagram useful in explaining a principle on which axial chromatic aberration occurs.

The magnification chromatic aberration correction unit 1402 is significant in terms of the following. In a color imaging system, a color that does not exist naturally is produced as blur (chromatic aberration) around a bright area on an image due to chromatic aberration of imaging optical system. The chromatic aberration is broadly divided into lateral chromatic aberration (chromatic aberration of magnification) and longitudinal chromatic aberration (axial chromatic aberration). The chromatic aberration of magnification is a phenomenon in which images are formed at different positions along a focal plane according to wavelengths as shown in FIG. 15. The axial chromatic aberration is a phenomenon in which images are formed at different positions along an optical axis according to wavelengths as shown in FIG. 16.

In general, blurring width of chromatic aberration of magnification is significantly smaller as compared with axial chromatic aberration, and depending on shooting conditions such as aperture value, focal length, and subject distance, extremely thin blurs may appear in different ways according to interpolating directions.

In such a case, there is concern that in the evaluation value calculation process based on saturation by the demosaicing unit 105, chromatic aberration of magnification has an adversary effect. Thus, the magnification chromatic aberration correction unit 1402 carries out a magnification chromatic aberration correction process before the demosaicing process is carried out.

As a method for the magnification chromatic aberration correction process, for example, there are possible methods such as geometric transformation in which planes of respective R, G, and B colors are differently distorted. Regarding the degree of distortion, data for use in correcting for chromatic aberration of magnification according to lens type, aperture value, focal length, subject distance, and so on is recorded in memory in advance, and the data is read out for correcting at the time of preliminary processing. In addition, a variety of methods such as a method in which the departure of R and B planes from a G plane in an image is analyzed and corrected for may be used.

Because as described above, by carrying out the scratch correction process, the white balance process, and the magnification chromatic aberration correction process before the demosaicing process is carried out, the reliabilities of evaluation values calculated by the demosaicing unit 105 can be enhanced, and the accuracy of interpolation can be improved.

Figure 17:
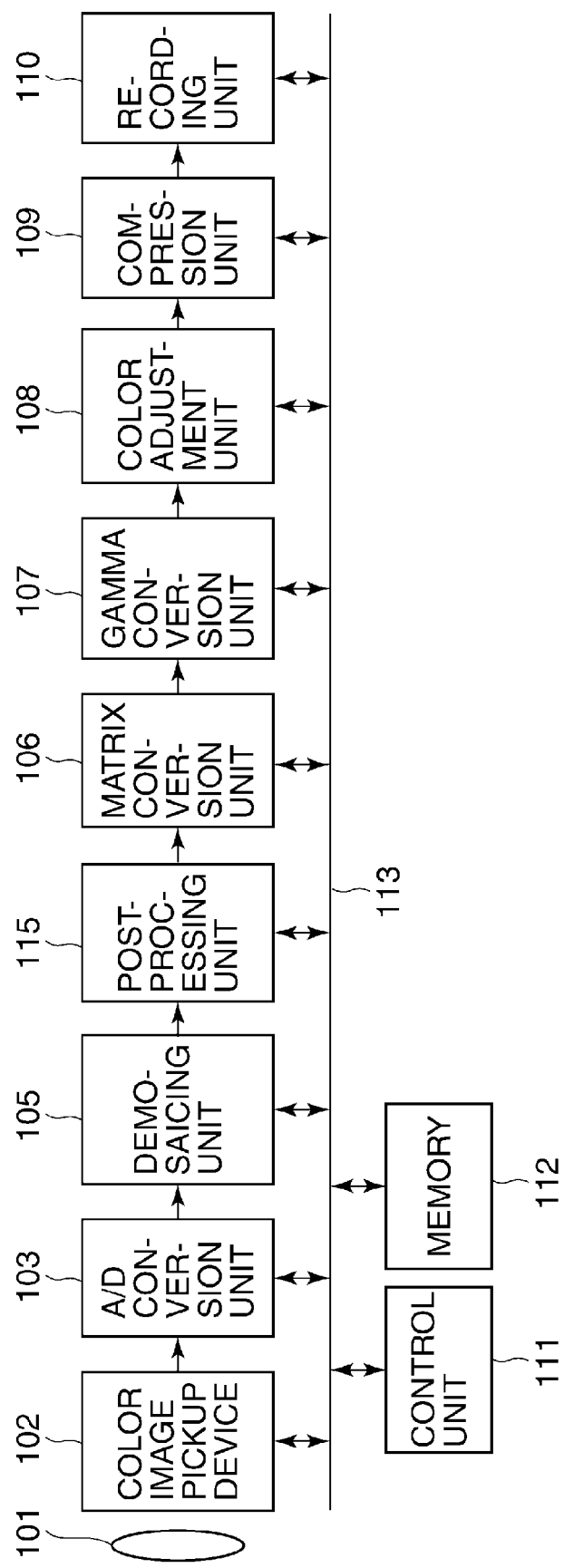
FIG. 17 is a block diagram schematically showing an arrangement of an image pickup apparatus according to a fourth embodiment of the present invention.
Figure 18A:
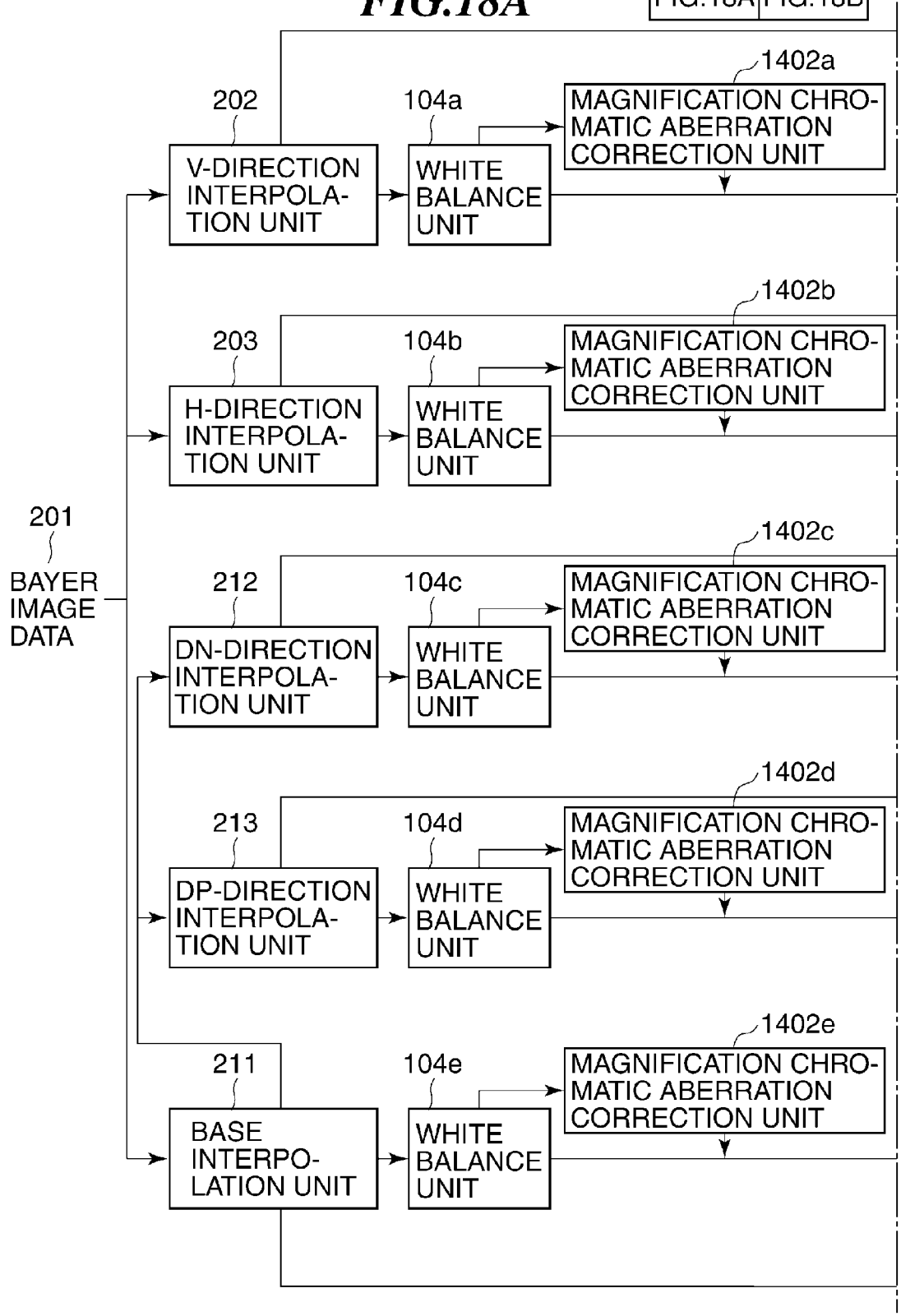

As shown in FIG. 17, a fourth embodiment differs from the first and second embodiments in FIG. 1 in that a postprocessing unit 115 is additionally provided in a stage next to the demosaicing unit 105. As shown in FIGS. 18A and 18B, the demosaicing unit 105 has white balance units 104a to 104e and magnification chromatic aberration correction units 1402a to 1402e associated with the interpolation units 202, 203, and 211 to 213 for the respective directions.

The demosaicing unit 105 according to the fourth embodiment carries out the same white balance process and magnification chromatic aberration correction process as those in the third embodiment as preliminary processes before evaluation values are calculated.

However, with respect to the post-interpolation RGB image data 210 in individual directions inputted to the image generation unit 220, the demosaicing unit 105 according to the fourth embodiment does not carry out the white balance process and the magnification chromatic aberration correction process as the preliminary processes. Namely, in the fourth embodiment, the white balance process and the magnification chromatic aberration correction process on post-interpolation RGB image data 210 in individual directions are carried out by the postprocessing unit 115.

As a result, demosaicing that generally involves a large amount of calculation does not have to be carried out each time, and hence image processing can be speeded up. It should be noted that the scratch correction process is preferably carried out before the demosaicing process is carried out because the scratch correction process has to be carried out only once.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-101859 filed Apr. 20, 2009, which is hereby incorporated by reference herein in its entirety.

What is claimed is:

1. An image processing apparatus comprising:
   an interpolation unit adapted to carry out, after having received color mosaic image data which is generated by an image pickup device having plural-color filters, an interpolation process of interpolating signals of missing colors onto each of pixels of the received color mosaic image data, by using image signals of neighboring pixels of the each of the pixels, and to output the interpolation process-carried out color mosaic image data,
   wherein said interpolation unit comprises:
   a direction-by-direction interpolation unit adapted to carry out, after having received the generated color mosaic image data, the interpolation process onto the each of the pixels of the input color mosaic image data in each of a plurality of predetermined directions, and to output a plurality of color image data, each of which corresponds to the each of the plurality of predetermined directions, said direction-by-direction interpolation unit carrying out the interpolation process onto the each of pixels of the received color mosaic image data, by using image signals of neighboring pixels located in a predetermined direction of the each of the pixels;
   an evaluation unit adapted to calculate, after having received the plurality of color image data output from said direction-by-direction interpolation unit, an evaluation value of each of pixels of the each of the plurality of color image data, by using homogeneity and signal intensity of the each of the pixels, said evaluation unit calculating, based on dispersion of signals of pixels included in a predetermined-sized region, homogeneity of a pixel located in a center of the predetermined-sized region, and calculating, based on saturation of signals of pixels included in the predetermined sized region, signal intensity of the pixel located in the center of the predetermined-sized region; and
   an image formation unit adapted to generate, after having received the plurality of color image data output from said direction-by-direction interpolation unit and the evaluation value of the each of the pixels of the each of the plurality of color image data calculated by said evaluation unit, signals of the pixels based on the evaluation value of the each of the pixels, said image formation unit being adopted to select, based on the evaluation value of the each of the pixels, one signal from the generated signals of the pixels of the plurality of the color image data onto the each of the pixels, or to generate, based on the evaluation value of the each of the pixels of the plurality of the color image data, one signal of the pixels by combining the signals of the pixels of the plurality of the color image data.

2. An image processing apparatus according to claim 1, wherein the evaluation unit evaluates the signal intensity using a G signal, an R-G signal, and a B-G signal.

3. An image processing apparatus according to claim 1, wherein the evaluation unit evaluates a dispersion degree using a color aberration in a L*a*b* uniform color space.

4. An image processing apparatus according to claim 1, wherein the evaluation unit evaluates a dispersion degree using a G signal, an R-G signal, and a B-G signal.

5. An image processing apparatus according to claim 1, wherein the evaluation unit makes a two-dimensional plane pass through a low-pass filter, the two-dimensional plane comprising of evaluation values of the each of pixels evaluated in the each of the plurality of color image data.

6. An image processing apparatus according to claim 1, wherein based on evaluation values of the each of the pixels evaluated in the plurality of color image data by the evaluation unit, the image formation unit calculates a combination ratio of the signals in the plurality of color image data, and combines the signals in the plurality of color image data at the combination ratio.

7. A control method for an image processing apparatus, comprising:
an interpolation step of carrying out, after having received color mosaic image data which is generated by an image pickup device having plural-color filters, an interpolation process of interpolating signals of missing colors onto each of pixels of the received color mosaic image data, by using image signals of neighboring pixels of the each of the pixels, and to output the interpolation process-carried out color mosaic image data,
wherein said interpolation step comprises:
a direction-by-direction interpolation step of carrying out, after having received the generated color mosaic image data, the interpolation process onto the each of the pixels of the input color mosaic image data in each of a plurality of predetermined directions, and to output a plurality of color image data, each of which corresponds to the each of the plurality of predetermined directions, said direction-by-direction interpolation step carrying out the interpolation process onto the each of pixels of the received color mosaic image data, by using image signals of neighboring pixels located in a predetermined direction of the each of the pixels;
an evaluation step of calculating, after having received the plurality of color image data output from said direction-by-direction interpolation step, an evaluation value of each of pixels of the each of the plurality of color image data, by using homogeneity and signal intensity of the each of the pixels, said evaluation step calculating, based on dispersion of signals of pixels included in a predetermined-sized region, homogeneity of a pixel located in a center of the predetermined-sized region, and calculating, based on saturation of signals of pixels included in the predetermined sized region, signal intensity of the pixel located in the center of the predetermined-sized region; and
an image formation step of generating, after having received the plurality of color image data output from said direction-by-direction interpolation step and the evaluation value of the each of the pixels of the each of the plurality of color image data calculated by said evaluation step, signals of the pixels based on the evaluation value of the each of the pixels, said image formation step selecting, based on the evaluation value of the each of the pixels, one signal from the generated signals of the pixels of the plurality of the color image data onto the each of the pixels, or generating, based on the evaluation value of the each of the pixels of the plurality of the color image data, one signal of the pixels by combining the signals of the pixels of the plurality of the color image data.

8. A non-transitory storage medium storing a program for causing a computer to execute a control method for an image processing apparatus according to claim 7.

9. A control method according to claim 7 wherein the evaluation step makes a two-dimensional plane through a low-pass filter, the two-dimensional lane comprising of evaluation values of the each of pixels evaluated in each of the plurality of color image data.

10. An image processing apparatus according to claim 1, comprising
a white balance unit adapted to carry out a white balance process on the color mosaic image data,
wherein the interpolation unit receives the color or mosaic image data on which the white balance process is carried out.

* * * * *